United States Patent
Evans et al.

(10) Patent No.: US 11,870,084 B2
(45) Date of Patent: *Jan. 9, 2024

(54) THIN AEROGEL MATERIALS

(71) Applicant: Aspen Aerogels, Inc.

(72) Inventors: Owen Richard Evans, Chelmsford, MA (US); Nicholas Anthony Zafiropoulos, Wayland, MA (US); Shannon Olga White, Bolton, MA (US); Wenting Dong, Marlborough, MA (US); Wendell E. Rhine, Belmont, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,369

(22) Filed: Jan. 27, 2023

(65) Prior Publication Data

US 2023/0170556 A1 Jun. 1, 2023

Related U.S. Application Data

(63) Continuation of application No. 17/738,861, filed on May 6, 2022, now Pat. No. 11,658,361, which is a
(Continued)

(51) Int. Cl.
*H01M 50/138* (2021.01)
*B01J 13/00* (2006.01)
(Continued)

(52) U.S. Cl.
CPC ....... *H01M 50/138* (2021.01); *B01J 13/0091* (2013.01); *H01M 6/36* (2013.01);
(Continued)

(58) Field of Classification Search
CPC .......... B01J 13/0091; H01M 50/117
See application file for complete search history.

(56) References Cited

U.S. PATENT DOCUMENTS

| 2,188,007 A | 1/1940 | Kistler |
| 3,881,978 A | 5/1975 | Livingston et al. |

(Continued)

FOREIGN PATENT DOCUMENTS

| WO | WO-03064025 A1 | 8/2003 |
| WO | WO-2006024010 A2 | 3/2006 |
| WO | WO-2015065557 A1 | 5/2015 |

OTHER PUBLICATIONS

"U.S. Appl. No. 14/738,193, 312 Amendment filed Apr. 21, 2022", 2 pgs.
(Continued)

*Primary Examiner* — Peter F Godenschwager
(74) *Attorney, Agent, or Firm* — Schwegman Lundberg & Woessner, P.A.

(57) ABSTRACT

The present invention provides a fiber-reinforced aerogel material which can be used as insulation in thermal battery applications. The fiber-reinforced aerogel material is highly durable, flexible, and has a thermal performance that exceeds the insulation materials currently used in thermal battery applications. The fiber-reinforced aerogel insulation material can be as thin as 1 mm less, and can have a thickness variation as low as 2% or less. Also provided is a method for improving the performance of a thermal battery by incorporating a reinforced aerogel material into the thermal battery. Further provided is a casting method for producing thin fiber-reinforced aerogel materials.

20 Claims, 6 Drawing Sheets

Related U.S. Application Data continuation of application No. 14/738,193, filed on Jun. 12, 2015, now Pat. No. 11,380,953.

(60) Provisional application No. 62/015,757, filed on Jun. 23, 2014.

(51) Int. Cl.

| | |
|---|---|
| *H01M 50/122* | (2021.01) |
| *H01M 50/117* | (2021.01) |
| *H01M 50/131* | (2021.01) |
| *H01M 50/121* | (2021.01) |
| *H01M 50/124* | (2021.01) |
| *H01M 50/133* | (2021.01) |
| *H01M 50/116* | (2021.01) |
| *H01M 6/36* | (2006.01) |
| *H01M 6/50* | (2006.01) |

(52) U.S. Cl.
CPC ....... *H01M 6/5072* (2013.01); *H01M 50/116* (2021.01); *H01M 50/117* (2021.01); *H01M 50/121* (2021.01); *H01M 50/122* (2021.01); *H01M 50/124* (2021.01); *H01M 50/131* (2021.01); *H01M 50/133* (2021.01)

(56) References Cited

U.S. PATENT DOCUMENTS

| | | | |
|---|---|---|---|
| 4,363,738 A | 12/1982 | Kummermehr | |
| 4,447,345 A | 5/1984 | Kummermehr et al. | |
| 4,619,908 A | 10/1986 | Cheng et al. | |
| 4,667,417 A | 5/1987 | Graser et al. | |
| 4,717,708 A | 1/1988 | Cheng et al. | |
| 4,811,538 A | 3/1989 | Lehnert et al. | |
| 4,966,919 A | 10/1990 | Williams, Jr. et al. | |
| 5,037,859 A | 8/1991 | Williams, Jr. et al. | |
| 5,124,101 A | 6/1992 | Hirao et al. | |
| 5,275,796 A | 1/1994 | Tillotson et al. | |
| 5,306,555 A | 4/1994 | Ramamurthi et al. | |
| 5,565,142 A | 10/1996 | Deshpande et al. | |
| 5,691,392 A | 11/1997 | Okoroafor et al. | |
| 5,786,059 A | 7/1998 | Frank et al. | |
| 5,789,075 A * | 8/1998 | Frank ..................... C04B 30/02 423/325 | |
| 5,830,387 A | 11/1998 | Yokogawa et al. | |
| 5,866,027 A | 2/1999 | Frank et al. | |
| 5,895,730 A | 4/1999 | Ritchie | |
| 5,945,182 A | 8/1999 | Fowler et al. | |
| 5,962,539 A | 10/1999 | Perrut et al. | |
| 5,972,254 A | 10/1999 | Sander | |
| 5,973,015 A | 10/1999 | Coronado et al. | |
| 6,040,375 A | 3/2000 | Behme et al. | |
| 6,068,882 A | 5/2000 | Ryu | |
| 6,080,475 A | 6/2000 | Frank et al. | |
| 6,083,619 A | 7/2000 | Frank et al. | |
| 6,087,407 A | 7/2000 | Coronado et al. | |
| 6,136,216 A | 10/2000 | Fidler et al. | |
| 6,140,377 A | 10/2000 | Schwertfeger et al. | |
| 6,187,250 B1 | 2/2001 | Champagne | |
| 6,197,270 B1 | 3/2001 | Sonoda et al. | |
| 6,198,249 B1 | 3/2001 | Kroll et al. | |
| 6,479,416 B1 | 11/2002 | Frank et al. | |
| 6,620,355 B1 | 9/2003 | Schmidt | |
| 6,656,527 B1 | 12/2003 | Gessner et al. | |
| 6,670,402 B1 | 12/2003 | Lee et al. | |
| 6,770,584 B2 | 8/2004 | Barney et al. | |
| 6,887,563 B2 | 5/2005 | Frank et al. | |
| 6,989,123 B2 | 1/2006 | Lee et al. | |
| 7,078,359 B2 | 7/2006 | Stepanian et al. | |
| 7,399,439 B2 | 7/2008 | Lee et al. | |
| 7,504,346 B2 | 3/2009 | Stepanian et al. | |
| 7,780,890 B2 | 8/2010 | Lee et al. | |
| 7,833,916 B2 | 11/2010 | Leeser et al. | |
| 8,214,980 B2 | 7/2012 | Bullock et al. | |
| 8,394,492 B1 | 3/2013 | Leventis et al. | |
| 9,593,206 B2 | 3/2017 | White et al. | |
| 9,840,959 B2 | 12/2017 | Davidson | |
| 9,868,843 B2 | 1/2018 | Evans et al. | |
| 10,227,472 B2 | 3/2019 | Evans et al. | |
| 10,233,303 B2 | 3/2019 | Evans et al. | |
| 11,380,953 B2 * | 7/2022 | Evans ..................... H01M 6/36 |
| 11,588,196 B2 * | 2/2023 | Evans .................. H01M 50/117 |
| 11,658,361 B2 | 5/2023 | Evans et al. | |
| 2002/0094426 A1 | 7/2002 | Stepanian et al. | |
| 2003/0215640 A1 | 11/2003 | Ackerman et al. | |
| 2005/0167891 A1 | 8/2005 | Lee et al. | |
| 2006/0035054 A1 | 2/2006 | Stepanian et al. | |
| 2006/0116433 A1 | 6/2006 | Lee et al. | |
| 2006/0246806 A1 | 11/2006 | Rhine et al. | |
| 2006/0261304 A1 | 11/2006 | Muthukumaran et al. | |
| 2006/0263587 A1 | 11/2006 | Ou et al. | |
| 2006/0264132 A1 | 11/2006 | Leeser et al. | |
| 2007/0152363 A1 | 7/2007 | Begag et al. | |
| 2007/0222116 A1 | 9/2007 | Gould et al. | |
| 2007/0238008 A1 | 10/2007 | Hogan et al. | |
| 2007/0259979 A1 | 11/2007 | Lee | |
| 2007/0264895 A1 | 11/2007 | Jaffee et al. | |
| 2008/0302059 A1 | 12/2008 | Du Plessis et al. | |
| 2009/0029147 A1 | 1/2009 | Tang et al. | |
| 2010/0140840 A1 | 6/2010 | Rouanet et al. | |
| 2011/0171389 A1 | 7/2011 | Zaghi et al. | |
| 2012/0097907 A1 | 4/2012 | Bauer et al. | |
| 2013/0005842 A1 | 1/2013 | Evans et al. | |
| 2013/0288007 A1 | 10/2013 | Wang et al. | |
| 2014/0044929 A1 | 2/2014 | Evans et al. | |
| 2016/0380244 A1 | 12/2016 | Evans et al. | |
| 2018/0112058 A1 | 4/2018 | Evans et al. | |
| 2018/0134867 A1 | 5/2018 | Evans et al. | |
| 2022/0271375 A1 | 8/2022 | Evans et al. | |

OTHER PUBLICATIONS

"U.S. Appl. No. 14/738,193, Advisory Action dated Aug. 13, 2020", 4 pgs.

"U.S. Appl. No. 14/738,193, Examiner Interview Summary dated Feb. 10, 2020", 3 pgs.

"U.S. Appl. No. 14/738,193, Examiner Interview Summary dated Sep. 28, 2020", 3 pgs.

"U.S. Appl. No. 14/738,193, Examiner Interview Summary dated Dec. 27, 2021", 3 pgs.

"U.S. Appl. No. 14/738,193, Final Office Action dated May 28, 2020", 10 pgs.

"U.S. Appl. No. 14/738,193, Final Office Action dated Jul. 9, 2018", 16 pgs.

"U.S. Appl. No. 14/738,193, Final Office Action dated Oct. 9, 2020", 10 pgs.

"U.S. Appl. No. 14/738,193, Final Office Action dated Oct. 26, 2021", 11 pgs.

"U.S. Appl. No. 14/738,193, Non Final Office Action dated Jan. 20, 2022", 5 pgs.

"U.S. Appl. No. 14/738,193, Non Final Office Action dated Mar. 24, 2021", 10 pgs.

"U.S. Appl. No. 14/738,193, Non Final Office Action dated Oct. 15, 2019", 9 pgs.

"U.S. Appl. No. 14/738,193, Non Final Office Action dated Nov. 30, 2017", 12 pgs.

"U.S. Appl. No. 14/738,193, Notice of Allowance dated Mar. 4, 2022", 7 pgs.

"U.S. Appl. No. 14/738,193, Response filed Jan. 7, 2019 to Final Office Action dated Jul. 9, 2018", 10 pgs.

"U.S. Appl. No. 14/738,193, Response filed Jan. 28, 2022 to Non Final Office Action dated Jan. 20, 2022", 7 pgs.

"U.S. Appl. No. 14/738,193, Response filed Feb. 17, 2020 to Non Final Office Action dated Oct. 15, 2019", 8 pgs.

"U.S. Appl. No. 14/738,193, Response filed Mar. 4, 2021 to Final Office Action dated Oct. 9, 2020", 11 pgs.

"U.S. Appl. No. 14/738,193, Response filed Mar. 17, 2018 to Non Final Office Action dated Nov. 30, 2017", 13 pgs.

(56) References Cited

OTHER PUBLICATIONS

"U.S. Appl. No. 14/738,193, Response filed Jul. 23, 2021 to Non Final Office Action dated Mar. 24, 2021", 11 pgs.
"U.S. Appl. No. 14/738,193, Response filed Jul. 28, 2020 to Final Office Action dated May 28, 2020", 10 pgs.
"U.S. Appl. No. 14/738,193, Response filed Aug. 9, 2017 to Restriction Requirement dated Mar. 17, 2021", 7 pgs.
"U.S. Appl. No. 14/738,193, Response filed Dec. 22, 2021 to Final Office Action dated Oct. 26, 2021", 13 pgs.
"U.S. Appl. No. 14/738,193, Restriction Requirement dated Mar. 17, 2021", 17 pgs.
"U.S. Appl. No. 17/738,861, 312 Amendment filed Mar. 14, 2023", 6 pgs.
"U.S. Appl. No. 17/738,861, Non Final Office Action dated Jan. 9, 2023", 8 pgs.
"U.S. Appl. No. 17/738,861, Notice of Allowance dated Feb. 15, 2023", 7 pgs.
"U.S. Appl. No. 17/738,861, PTO Response to Rule 312 Communication dated Mar. 27, 2023", 2 pgs.
"U.S. Appl. No. 17/738,861, PTO Response to Rule 312 Communication dated Apr. 14, 2023", 2 pgs.
"U.S. Appl. No. 17/738,861, Response filed Jan. 26, 2023 to Non Final Office Action dated Jan. 9, 2023", 6 pgs.
"International Application Serial No. PCT/US2015/035727, International Search Report dated Apr. 28, 2016", 4 pgs.

\* cited by examiner

| Temp. (°C) | Thermal Conductivity (mW/m-K) | | |
|---|---|---|---|
| | Aerogel un-calcined at 0.4psi (1) | Aerogel calcined at 0.4psi (2) | Aerogel calcined at 2.0psi (3) |
| 25 | 12.5 | 14.8 | 15.0 |
| 50 | 12.8 | 15.3 | 15.5 |
| 100 | 13.5 | 16.2 | 16.5 |
| 200 | 15.4 | 18.4 | 18.9 |
| 300 | 18.7 | 21.4 | 22.0 |
| 400 | 22.7 | 25.1 | 25.8 |
| 500 | 29.0 | 30.1 | 30.6 |
| 600 | 39.8 | 37.7 | 37.8 |
| 650 | 48.0 | 45.1 | 42.2 |

THIN AEROGEL MATERIALS

REFERENCE TO PRIOR FILED APPLICATIONS

This application is a continuation of U.S. application Ser. No. 17/738,861, filed May 6, 2022, which claims priority to U.S. application Ser. No. 14/738,193, filed Jun. 12, 2015, which claims the benefit of U.S. Provisional Application 62/015,757 filed Jun. 23, 2014 under 35 U.S.C. § 119(e); which applications are incorporated by reference herein in their entirety.

STATEMENT OF GOVERNMENT SUPPORT

This invention was made with Government support under Contract HQ0147-12-C-0012 awarded by the Missile Defense Agency of the Department of Defense. The Government has certain rights in this invention.

BACKGROUND

Thermal batteries are batteries that employ inorganic salt electrolytes as barrier agents. Most thermal batteries are composed of a series of thermal cells, each having an anode, an electrolyte barrier, a cathode, and a pyrotechnic heating mass. The electrolyte barrier functions as a separator between the anode and the cathode, and is a relatively non-conductive solid at ambient temperatures. The thermal cells thus remain completely inert while the battery is stored at normal temperatures and the electrolyte barrier remains solid.

The thermal battery is activated by ignition of the pyrotechnic heating mass. This pyrotechnic initiation is normally provided by an energy impulse from a built-in initiator such as an electric match. The ignition of the pyrotechnic heating mass releases sufficient heat into the cell to melt the solid electrolyte barrier material into an electro-conductive liquid material. Ion exchange between the cathode and anode through the melted electro-conductive liquid material can then produce an electrical current which is transmitted through the terminals of the battery and into an external load.

A primary challenge in designing thermal batteries is heat management. Once activated, a thermal battery will continue to provide electrical energy as long as the electrolyte remains molten, or until the active electro-generating materials reach the point of functional exhaustion. It is therefore critical to keep the temperature inside the battery above the melting point of the electrolyte for as long as possible. It is also important that the thermal battery be as small as possible to reduce the weight, cost, and design limitations associated with larger batteries.

An effective approach to improving the life of a thermal battery is by improving the thermal insulation of the cells. An improvement to the insulation in a thermal battery will reduce heat loss from the cells, and better preserve the heat being generated by the pyrotechnic heating mass. It is important that insulation materials within the thermal battery have a uniform thickness to allow for reliable and predictable performance of the thermal battery.

Aerogels are among the most effective insulators known to man. Aerogels are formed by using innovative processing and drying techniques to replace the interstitial liquid phase of a gel with air. These innovative processing and drying techniques can reduce the capillary pressure and surface tension generated by evaporation in small pores, which often causes significant pore collapse and gel shrinkage during a traditional solvent extraction process.

However, aerogels can also be extremely brittle and difficult to handle. It is particularly difficult to incorporate aerogels into thermal batteries due to significant design and space limitations associated with thermal batteries. A need therefore exists for the development of reinforced aerogel materials which are uniformly thin, durable, easy to handle, and which have thermal insulation properties optimized for thermal battery applications.

SUMMARY OF THE INVENTION

The present invention provides a uniformly thin, fiber-reinforced aerogel insulation material which can be used in thermal battery applications. The fiber-reinforced aerogel insulation material is highly durable, flexible, and has a thermal performance that exceeds the insulation materials currently used in thermal battery applications. The fiber-reinforced aerogel insulation material can be as thin as 1 mm or less, and can have a thickness variation as low as 3% or less.

In one embodiment, the present invention provides a reinforced aerogel material having an average thickness of less than 10 mm and a thickness variation of less than 15%. Aerogel materials of the present invention can have a thickness of less than 10 mm, less than 7.5 mm, less than 5 mm, less than 4 mm, less than 3 mm, less than 2 mm, and less than 1 mm. Aerogel materials of the present invention can have a thickness variation of less than 15%, less than 10%, less than 8%, less than 6%, less than 5%, less than 4%, less than 3%, and less than 2%. In a preferred embodiment, the present invention provides a fiber-reinforced aerogel material having an average thickness of less than 2 mm, a thickness variation of less than 5%, and a thermal conductivity of about 25 mW/mK or less.

In another embodiment, the present invention provides a thermal battery comprising a reinforced aerogel material. The reinforced aerogel material can have an average thickness of less than 10 mm and a thickness variation of less than 15%. In a preferred embodiment, the thermal battery comprises a reinforced aerogel material having an average thickness of 2 mm or less, a thickness variation of 5% or less, and a thermal conductivity of about 25 mW/mK or less.

The present invention also provides a method for improving the performance of a thermal battery by incorporating a reinforced aerogel material into the thermal battery. In one embodiment, the reinforced aerogel material is incorporated into a thermal battery which previously lacked an insulation material. In another embodiment, the reinforced aerogel material is used to replace an existing insulation material in a thermal battery. In still another embodiment the reinforced aerogel material is incorporated into a thermal battery which has an existing insulation material, wherein the reinforced aerogel material provides an additional layer of insulation in the thermal battery.

The incorporation of the reinforced aerogel material into the thermal battery can result in an improved battery performance for the thermal battery, with the increase in performance resulting primarily from the incorporation of the reinforced aerogel material into the thermal battery. In one embodiment, the improved battery performance for the thermal battery, when measured at about −54° C., can be: i) an improved battery performance for 1V run time of up to about 300%; ii) an improved battery performance for 16V run time of up to about 250%; or iii) an improved battery performance for 22V run time of up to about 200%. In another embodiment, the improved battery performance for the thermal battery, when measured at about 21° C., can be: i) an improved battery performance for 1V run time of up to about 215%; ii) an improved battery performance for 16V run time of up to about 200%; or iii) an improved battery performance for 22V run time of up to about 175%.

The present invention further provides a method for producing a thin fiber-reinforced aerogel material using a casting system. In one embodiment, the method can comprise the following steps: a) providing a casting surface and a casting frame, wherein an inner boundary of the casting frame encloses a casting area on the casting surface; b) producing a sol-gel solution; c) placing a fiber reinforcement material into the casting area; d) dispensing the sol-gel solution into the casting area; e) applying pressure to the sol-gel solution to promote spreading of the sol-gel solution through the fiber reinforcement material in the casting area; f) allowing the sol-gel solution to gel, thereby forming a gel material; and g) drying the gel material to produce a fiber-reinforced aerogel material. Step (e) can occur either before or at the same time as step (f).

In another embodiment, the casting method further comprises applying pressure to the sol-gel solution to promote spreading of the sol-gel solution through the fiber reinforcement material in the casting area until the thickness of the sol-gel solution is the same as the thickness of the casting frame. Pressure can be applied to the sol-gel solution with a pressure source, such as a press or a roll bar. The pressure from the pressure source can be continuously applied to the sol-gel solution until the resulting gel has a uniform thickness comparable to the target thickness of the casting frame. The resulting fiber-reinforced aerogel material can have an average thickness of 5 mm or less, a thickness variation of 10% or less, and a thermal conductivity of about 25 mW/mK or less. The resulting fiber-reinforced aerogel material from the casting method can also be incorporated into a thermal battery.

DETAILED DESCRIPTION

Figure 1A:
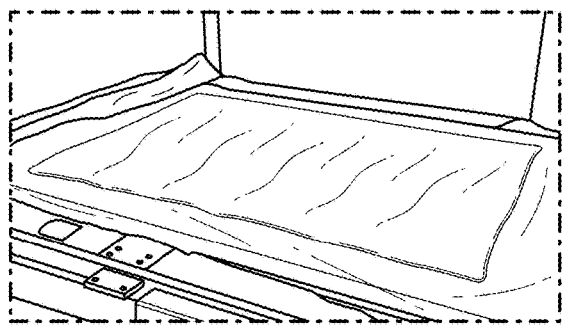
FIGS. 1a-1h depict a method for producing thin aerogel materials of a uniform thickness, according to one embodiment of the invention.

The present invention provides a fiber-reinforced aerogel insulation material which can be used in thermal battery applications. The fiber-reinforced aerogel material of the present invention is highly durable, flexible, and has a thermal performance that exceeds the insulation materials currently used in thermal battery applications. The fiber-reinforced aerogel material can be as thin as 1 mm or less, and can have a thickness variation as low as 2% or less. The combination of uniform thinness and improved insulating capability in the aerogel material of the present invention allows for the production of more capable thermal batteries with extended operational lifetimes and improved practical energy densities, while also reducing the insulation cost to the thermal battery system.

The present invention also provides a method for improving the performance of a thermal battery by incorporating a reinforced aerogel material into the thermal battery. The incorporation of a reinforced aerogel material into the thermal battery can result in an improved battery performance for the thermal battery, with the increase in performance resulting primarily from the incorporation of the reinforced aerogel material into the thermal battery. The improved battery performance for the improved thermal battery can be up to about 300% improvement over the original thermal battery.

The present invention further includes a method of producing uniformly thin aerogel materials. The method uses a casting table comprising a casting surface, and a casting frame that encloses a casting area on the casting surface. A fiber-reinforced gal can be cast in the casting area of the casting table, with the casting frame providing a template for uniform thickness of the gel material being cast. The method can also include a source of pressure which applies a uniform pressure across the majority or the entirety of the gel material to promote spreading and thinning of the aerogel material through the entire area of the casting area. The pressure can be applied until the gel material has a uniform thickness comparable to the target thickness of the casting frame. Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties, or by the innovative processing and extraction techniques used to produce them.

Within the context of the present invention, the term "aerogel" or "aerogel material" refers to a gel comprising a framework of interconnected structures, with a corresponding network of interconnected pores integrated within the framework, and containing gases such as air as a dispersed interstitial medium; and which further satisfies at least one of the following characteristics: (1) the gel is at least partially dried using innovative processing and extraction techniques which cause low pore collapse and low shrinkage to the framework structure of the gel; or (2) the gel is characterized by the following physical and structural properties attributable to aerogels: (a) an average pore diameter ranging from about 2 nm to about 100 nm, (b) a porosity of at least 80% or more, and (c) a surface area of about 20 m2/g or more.

Within the context of the present invention, the term "aerogel-like material" refers to porous materials which have a gel framework and pore structure similar to aerogels, and which are characterized by the following properties: (a) an average pore diameter ranging from about 0.5 nm to about 300 nm; (b) a porosity of at least 50% or more; and (c) a surface area of about 10 m2/g or more.

Aerogel-like materials of the present invention thus include any aerogels or other open-celled compounds which satisfy the defining elements set forth in previous paragraphs; including compounds which can be otherwise categorized as xerogels, cryogels, ambigels, microporous materials, and the like.

Aerogel materials and aerogel-like materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material or aerogel-like material.

Within the context of the present invention, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In one embodiment, the innovative processing and extraction technique uses near critical or super critical fluids, or near critical or super critical conditions, to extract the liquid interstitial phase from a wet-gel material. This can be accomplished by removing the liquid interstitial phase from the gel at near or above the critical point of the liquid or mixture of liquids. Co-solvents and solvent exchanges can be used to optimize the near critical or super critical fluid extraction process.

In another embodiment, the innovative processing and extraction technique includes the modification of the gel framework to reduce the irreversible effects of capillary pressures and other mass transfer limitations at the liquid-vapor interface. This embodiment can include the treatment of a gel framework with a hydrophobizing agent, or other functionalizing agents, which allow a gel framework to withstand or recover from any collapsing forces during liquid phase extraction conducted below the critical point of the liquid interstitial phase. This embodiment can also include the incorporation of functional groups or framework elements which provide a framework modulus which is sufficiently high to withstand or recover from collapsing forces during liquid phase extraction conducted below the critical point of the liquid interstitial phase.

Within the context of the present invention, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present invention can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present invention, the term "aerogel composition" refers to any composite material which includes aerogel material as a component of the composite. Examples of aerogel compositions include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials. Within the context of the present invention, the term "aerogel-like composition" refers to any composite material which includes aerogel-like materials as an element of the composite.

Within the context of the present invention, the term "reinforced aerogel composition" refers to aerogel compositions which comprise a reinforcing phase within the aerogel material which is not part of the aerogel framework. The reinforcing phase can be any material which provides increased flexibility, resilience, conformability or structural stability to the aerogel material. Examples of well-known reinforcing materials include, but are not limited to: open-cell foam reinforcement materials, polymeric reinforcement materials, and fiber reinforcement materials such as discrete fibers, woven materials, non-woven materials, battings, webs, mats, and felts. Additionally, fiber based reinforcements may be combined with one or more of the other reinforcing materials, and can be oriented continuously throughout or in limited preferred parts of the composition.

Within the context of the present invention, the term "fiber-reinforced aerogel composition" refers to a reinforced aerogel composition which comprises a fiber reinforcement material as a reinforcing phase. Fiber reinforcement materials can include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly(ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), poly olefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W. L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO—Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

Within the context of the present invention, the terms "aerogel blanket" or "aerogel blanket composition" refer to aerogel compositions reinforced with a continuous sheet of fiber reinforcement material. Aerogel blanket compositions can be differentiated from other fiber reinforced aerogel composition which are reinforced with a non-continuous fiber network, such as separated agglomerates or clumps of fiber materials. Aerogel blanket compositions are particularly useful for applications requiring flexibility, since they are highly conformable and can be used like a blanket to cover surfaces of simple or complex geometry, while also retaining the excellent thermal insulation properties of aerogels. Aerogel blanket compositions and similar fiber-reinforced aerogel compositions are described in Published US patent application 2002/0094426 (paragraphs 12-16, 25-27, 38-58, 60-88), which is hereby incorporated by reference according to the individually cited sections and paragraphs.

Within the context of the present invention, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by innovative processing and extraction to replace the mobile interstitial liquid phase in the gel with air. Examples of wet gels include, but are not limited to: alcogels, hydrogels, ketogels, carbonogels, and any other wet gels known to those in the art.

Within the context of the present invention, the terms "additive" or "additive element" refer to materials which can be added to an aerogel composition before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published US Pat. App. 20070272902 A1 (Paragraphs [0008] and [0010]-[0039]) includes teachings of smoke suppressants and fire suppressants, and is hereby incorporated by reference according to the individually cited paragraphs.

Within the context of the present invention, the terms "flexible" and "flexibility" refer to the ability of an aerogel material or composition to be bent or flexed without macrostructural failure. Preferably, aerogel materials or compositions of the present invention are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, PA). Aerogel materials or compositions of the present invention can be flexible, highly flexible, and/or classified flexible. Aerogel materials or compositions of the present invention can also be drapable. Within the context of the present invention, the terms "drapable" and "drapability" refer to the ability of an aerogel material or composition to be bent or flexed to 90° or more with a radius of curvature of about 4 inches or less, without macroscopic failure. An aerogel material or composition of the present invention is preferably flexible such that the composition is non-rigid and may be applied and conformed to three-dimensional surfaces or objects, or preformed into a variety of shapes and configurations to simplify installation or application.

Within the context of the present invention, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present invention preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions which can be classified as resilient flexible according to ASTM classification standard C1101 (ASTM International, West Conshohocken, PA).

Within the context of the present invention, the term "self-supporting" refers to the ability of an aerogel material or composition to be flexible and/or resilient based primarily on the physical properties of the aerogel and any reinforcing phase in the aerogel composition. Self-supporting aerogel materials or compositions can be differentiated from other aerogel materials, such as coatings, which rely on an underlying substrate to provide flexibility and/or resilience to the material.

Within the context of the present invention, the term "shrinkage" refers to the ratio of: 1) the difference between the measured final density of the dried aerogel material or composition, or aerogel-like material or composition, and the target density calculated from solid content in the sol-gel precursor solution, relative to 2) the target density calculated from solid content in the sol-gel precursor solution. Shrinkage can be calculated by the following equation:

Shrinkage=[Final Density (g/cm3)−Target Density (g/cm3)]/[Target Density (g/cm3)].

Preferably, shrinkage of an aerogel material of the present invention is preferably 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present invention, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, PA); a Test Method for Steady-State Heat Flux Measurements and Thermal Transmission Properties by Means of the Guarded-Hot-Plate Apparatus (ASTM C177, ASTM International, West Conshohocken, PA); a Test Method for Steady-State Heat Transfer Properties of Pipe Insulation (ASTM C335, ASTM International, West Conshohocken, PA); a Thin Heater Thermal Conductivity Test (ASTM C1114, ASTM International, West Conshohocken, PA); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present invention, thermal conductivity measurements are acquired according to ASTM C177 or ASTM C518 standards, at a temperature of about 37.5° C. and a compression of about 2 psi, unless otherwise stated. Alternatively, thermal conductivity may also be determined using EN 12667 or other relevant standards, when measurements are expressly identified as such. Preferably, aerogel materials or compositions of the present invention have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present invention, the term "density" refers to a measurement of the mass per unit volume of an aerogel material or composition. The term "density" generally refers to the true density of an aerogel material, as well as the bulk density of an aerogel composition. Density is typically recorded as kg/m3 or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, PA); Standard Test Methods for Thickness and Density of Blanket or Batt Thermal Insulations (ASTM C167, ASTM International, West Conshohocken, PA); or Determination of the apparent density of preformed pipe insulation (ISO 18098, International Organization for Standardization, Switzerland). Within the context of the present invention, density measurements are acquired according to ASTM C167 standards, unless otherwise stated. Preferably, aerogel materials or compositions of the present invention have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present invention, the term "liquid water absorption" refers to a measurement of the potential of an aerogel material or composition to absorb liquid water. Liquid water absorption can be expressed as a percent (by weight) of water which is absorbed or otherwise retained by an aerogel material or composition when exposed to liquid water under certain measurement conditions. The liquid water absorption of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, PA); Thermal insulating products for building applications: Determination of short term water absorption by partial immersion (EN 1609, British Standards Institution, United Kingdom). Within the context of the present invention, measurements of liquid water absorption are acquired according to ASTM C1511 standards, under ambient pressure and temperature, unless otherwise stated. Preferably, aerogel materials or compositions of the present invention can have a liquid water absorption of about 50% or less, about 40% or less, about 30% or less, about 20% or less, about 15% or less, about 10% or less, about 8% or less, about 3% or less, about 2% or less, about 1% or less, about 0.1% or less, or in a range between any two of these values. An aerogel material or composition which has "improved liquid water absorption" relative to another aerogel material or composition will have a lower percentage of liquid water absorption/retention relative to the reference aerogel materials or compositions.

Within the context of the present invention, the term "water vapor absorption" refers to a measurement of the potential of an aerogel material or composition to absorb water vapor. Water vapor absorption can be expressed as a percent (by weight) of water which is absorbed or otherwise retained by an aerogel material or composition when exposed to water vapor under certain measurement conditions. The water vapor absorption of an aerogel material or composition may be determined by methods known in the art, including, but not limited to: Standard Test Method for Determining the Water Vapor Sorption of Unfaced Mineral Fiber Insulation (ASTM C1104, ASTM International, West Conshohocken, PA). Within the context of the present invention, measurements of water vapor absorption are acquired according to ASTM C1104 standards, under ambient pressure and temperature, unless otherwise stated. Preferably, aerogel materials or compositions of the present invention can have a water vapor absorption of about 50% or less, about 40% or less, about 30% or less, about 20% or less, about 15% or less, about 10% or less, about 8% or less, about 3% or less, about 2% or less, about 1% or less, about 0.1% or less, or in a range between any two of these values. An aerogel material or composition which has "improved water vapor absorption" relative to another aerogel material or composition will have a lower percentage of water vapor absorption/retention relative to the reference aerogel materials or compositions.

Within the context of the present invention, the term "hydrophobicity" refers to a measurement of the ability of an aerogel material or composition to repel water. The hydrophobicity of an aerogel material or composition can relate to the ability of the material or composition to repel the absorption of liquid water (corresponding to liquid water absorption), the ability of the material or composition to repel the absorption of water vapor (corresponding to water vapor absorption), or a combination thereof. Hydrophobicity of a material or composition can be expressed as a percent (by weight) of water which is absorbed or otherwise retained by an aerogel material or composition when exposed to liquid water under certain measurement conditions, or when exposed to water vapor under certain measurement conditions. As an example, a hydrophobicity of 50% or less would indicate that an aerogel material or composition has either a liquid water absorption of 50% or less, a water vapor absorption of 50% or less, or both. Preferably, aerogel materials or compositions of the present invention can have a hydrophobicity of about 50% or less, about 40% or less, about 30% or less, about 20% or less, about 15% or less, about 10% or less, about 8% or less, about 3% or less, about 2% or less, about 1% or less, about 0.1% or less, or in a range between any two of these values. An aerogel material or composition which has "improved hydrophobicity" relative to another aerogel material or composition will have improved liquid water absorption relative to the reference aerogel materials or compositions, improved water vapor absorption relative to the reference aerogel materials or compositions, or both.

Hydrophobicty of an aerogel material or composition can also be expressed by measuring the equilibrium contact angle of a water droplet at the interface with the surface of the material. Aerogel materials or compositions of the present invention can have a water contact angle of about 90° or more, about 120° or more, about 130° or more, about 140° or more, about 150° or more, about 160° or more, about 170° or more, about 175° or more, or in a range between any two of these values. Within the context of the present invention, the terms "super hydrophobic" or "super hydrophobicity" refer materials or compositions which have a water contact angle of about 150° or more.

Within the context of the present invention, the term "thermal battery" refers to a combination of one or more thermal cells. The term "thermal cell" refers to an energy cell that is activated by applying heat to melt a solidified electrolyte barrier.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present invention, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethyl silicates, partially hydrolyzed polyethysilicates, monomeric alkylalkoxy silanes, bis-trialkoxy alkyl or aryl silanes, polyhedral silsesquioxanes, or combinations thereof.

In one embodiment of the present invention, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl triethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present invention to any specific type of hydrophobic treatment procedure or aerogel substrate. The present invention can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according to the following reaction: $R_NMX_{4-N}$ (hydrophobizing agent)+MOH (silanol)→$MOMR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: Y(R?M)2; where M is a metal; Y is bridging group such as NH or O; and R is a hydrophobic group such as CH3, CH2CH3, C6H6, or similar hydrophobic alkyl, cycloalkyl, or aryl moieites. Specific examples of such hydrophobizing agents include, but are not limited to: hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to: vinyltriethoxysilane and vinyltrimethoxysilane.

Organic aerogels are generally formed from carbon-based polymeric precursors. Such polymeric materials include, but are not limited to: resorcinol formaldehydes (RF), polyimide, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, $R—Si(OX)_3$, with traditional alkoxide precursors, $Y(OX)_4$. In these formulas: X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present invention, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the invention include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present invention are preferably inorganic silica aerogels formed primarily from alcohol solutions of hydrolyzed silicate esters formed from silicon alkoxides. However, the invention as a whole may be practiced with any other aerogel compositions known to those in the art, and is not limited to any one precursor material or amalgam mixture of precursor materials.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present invention to any specific type of aerogel and/or method of preparation. The present invention can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are strongly affected by the pH of the precursor solution and the molar ratio of the reactants, any pH and any molar ratios that permit the formation of gels may be used in the present invention.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like.

Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)4 + 4(C2H5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si—O—Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, $H_2SO_4$, $H_3PO_4$, oxalic acid and acetic acid. Any base may likewise be used to catalyze precursor reactions and to obtain a higher pH solution, with a preferable base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

A mold may be used to cast the gel materials of the present invention into desired shapes. One benefit of using a mold may be an improved aesthetic appearance. Another benefit may be the creation of features in the gel material which are difficult or damaging to produce without mold casting. Such features include, but are not limited to: holes, depressions, protrusions and patterns; all of which can allow for a better fit between the final aerogel material and a supporting structure. Reinforced aerogel materials can also be incorporated into this molding procedure.

Figure 2:
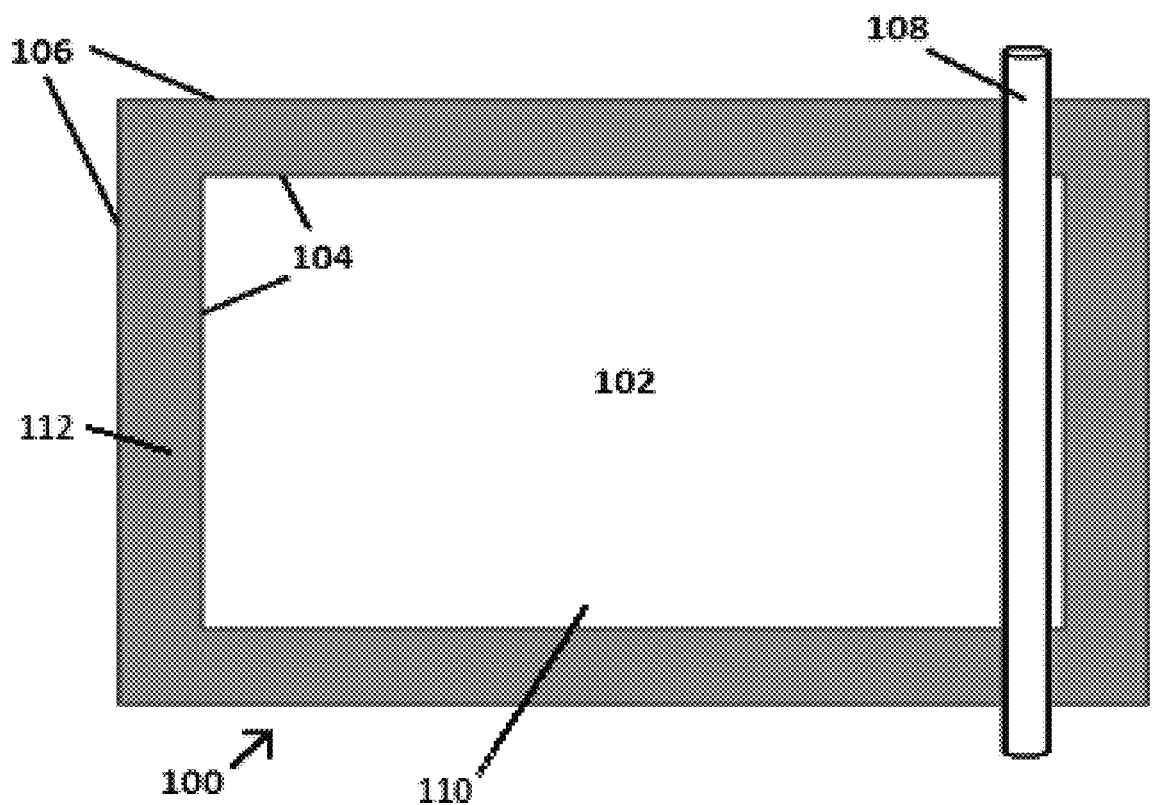
FIG. 2 illustrates a casting table 100 which can be used for the production of thin aerogel materials, according to one embodiment of the invention.

A casting table may be also used to cast the gel materials of the present invention. FIG. 2 illustrates a casting table 100 which can be used for the production of aerogel insulation sheets. The casting table 100 comprises an underlying casting surface 110 which can be covered with a non-stick coating or material, such as Teflon. The casting table 100 can also comprises an overlying casting frame 112 which has an outer perimeter 106 and an inner perimeter 104. The inner perimeter 104 of casting frame 112 encloses a casting area 102 on the casting surface 110. The thickness of the casting frame 112 can be adjusted to match a target thickness for the gel material being cast. The thickness of the casting frame 112 can then be used as a thickness template to ensure that the thickness of the resulting gel material matches the initial target thickness of the gel material.

FIGS. 1a-1h depict a preferred embodiment of the casting table which comprises a 4 ft×6 ft casting table coated with a Teflon sheet. A 4 ft×6 ft sheet of PETG (polyethylene terephthalate glycol-modified) having a thickness of 0.078 inches (~2 mm) was placed onto the casting table. A 3 ft×5 ft rectangle of PETG material was cut and removed from the interior of the 4 ft×6 ft PETG sheet. The remaining PETG material provided thickness control during the subsequent casting of the aerogel material. The thickness of the PETG material was chosen to provide a final cast thickness of between about 0.07 inches (~1.75 mm) and about 0.08 inches (~2 mm) for the aerogel insulation material.

To ensure that the gel material being cast on the casting table has a uniform thickness which matches the target thickness of the casting frame, a source of pressure can be applied to the gel material during the casting process, or subsequent to the casting process but prior to complete gelation of the gel material. The source of pressure can be any device which can be used to apply uniform pressure across the majority or the entirety of the gel material.

In one embodiment, the source of pressure comprises a solid sheet such as a press which extends over the entirety of the casting area 102. The solid sheet is used to apply a downward force onto the gel material in the cast to promote spreading and thinning of the aerogel material through the entire area of the casting area 102. A downward force continues to be applied until the solid sheet contacts the casting frame on all sides, thus providing a gel material of a uniform thickness comparable to the target thickness of the casting frame 112.

In another embodiment, the source of pressure comprises a roller bar 108 which extends across a span of the casting area 102. The roller bar 108 is used to apply a downward force onto the gel material in the cast to promote spreading and thinning of the aerogel material through the entire area of the casting area 102. The roller bar 108 can be advanced along the span of the casting area 102, and a downward force is applied to the roller bar 108 to maintain contact between the roller bar 108 the casting frame 112 on all sides, thus providing a gel material of a uniform thickness comparable to the target thickness of the casting frame 112.

Figure 3:
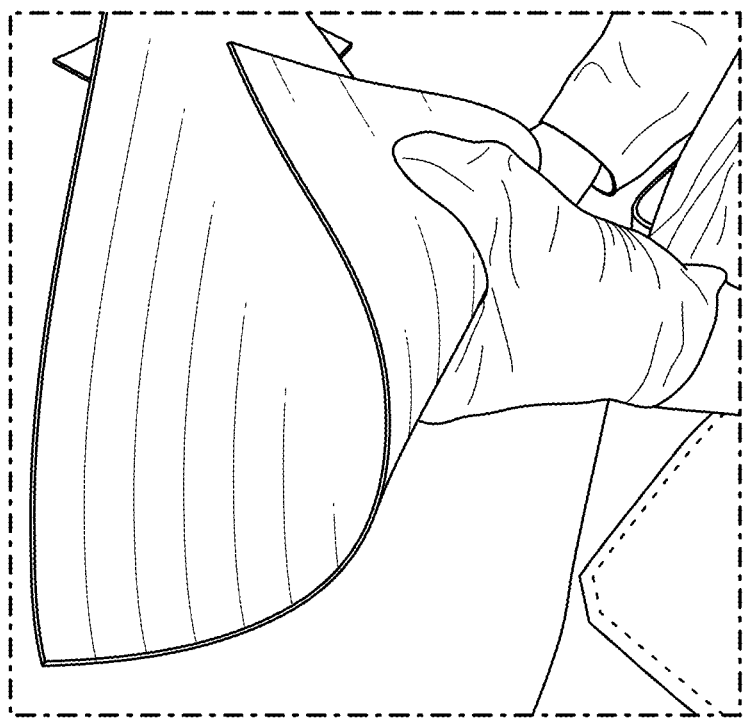
FIG. 3 shows an aerogel material having a thickness of about 0.07 inches (~1.75 mm) to about 0.08 inches (~2 mm), according to one embodiment of the invention.
Figure 4:
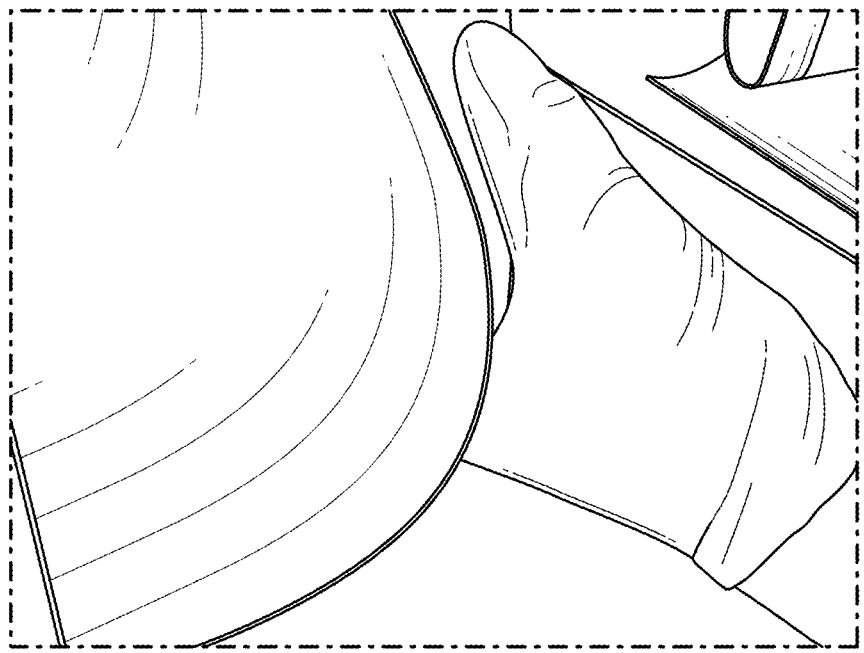
FIG. 4 shows an aerogel material having a thickness of about 0.03 inches (~0.75 mm) to 0.04 inches (~1 mm), according to one embodiment of the invention.
Figure 5:
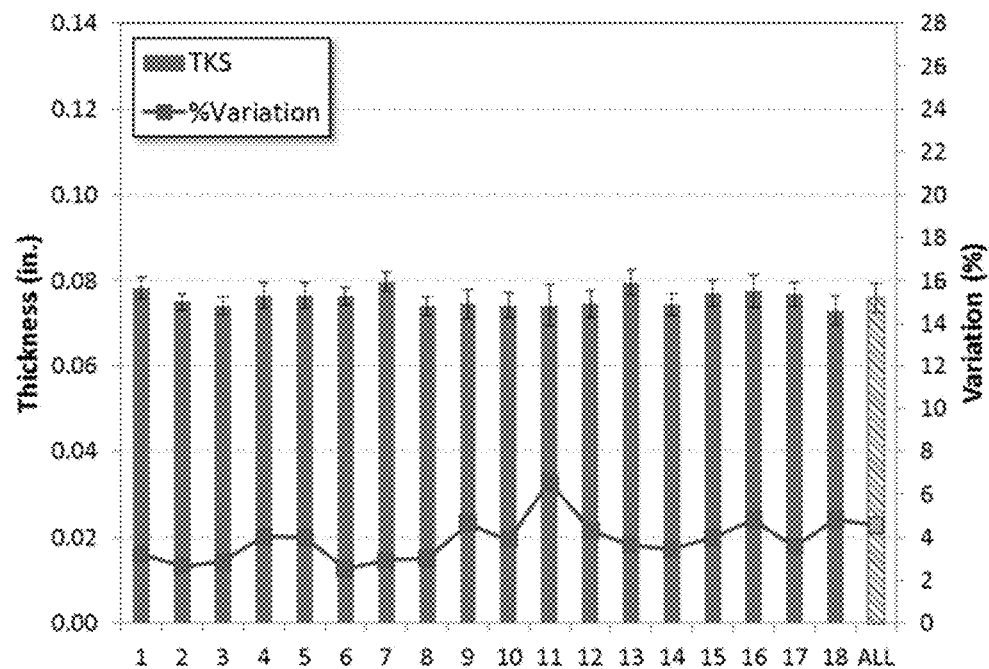
FIG. 5 is a chart depicting the thickness and thickness variation of multiple samples of an aerogel material having a target thickness of about 0.07 inches (~1.75 mm) to about 0.08 inches (~2 mm), according to one embodiment of the invention.
Figure 6:
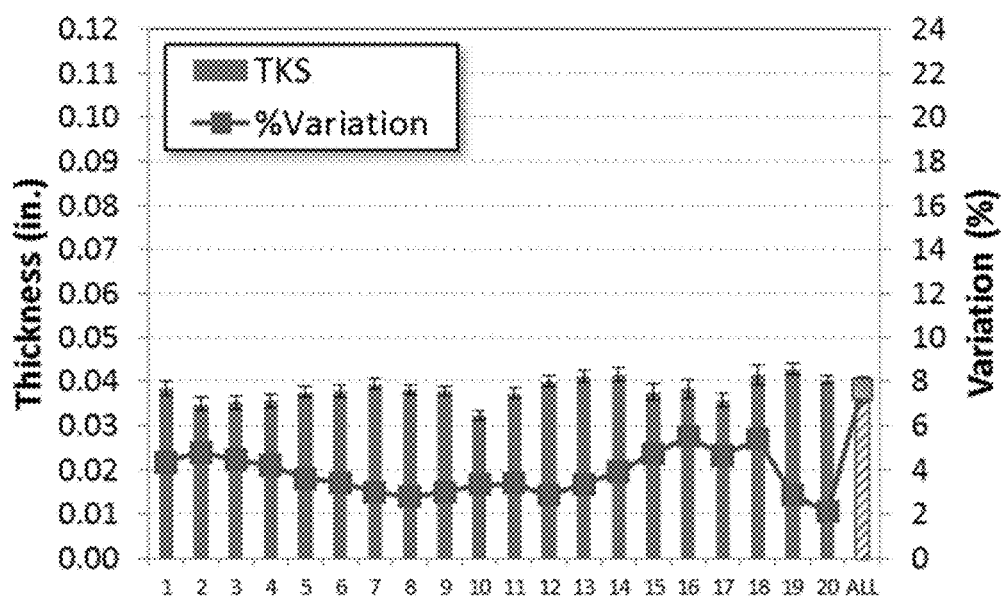
FIG. 6 is a chart depicting the thickness and thickness variation of multiple samples of an aerogel material having a target thickness of about 0.03 inches (~0.75 mm) to 0.04 inches (~1 mm), according to one embodiment of the invention.

Using a casting table allows for the production of aerogel materials which are extremely thin compared to standard aerogel materials. Aerogel materials of the present invention can have a thickness of less than 10 mm, less than 7.5 mm, less than 5 mm, less than 4 mm, less than 3 mm, less than 2 mm, and less than 1 mm. FIG. 3 and FIG. 5 represent a preferred embodiment of the present invention where the aerogel material has a thickness of between about 0.07 inches (~1.75 mm) to about 0.08 inches (~2 mm). FIG. 4 and FIG. 6 represent another preferred embodiment of the present invention where the aerogel material has a thickness of between about 0.03 (~0.75 mm) inches to about 0.04 inches (~1 mm). These extremely thin aerogel materials are advantageous because they can be incorporated into a broad range of applications which have extremely narrow space limitations for insulation materials, such as thermal batteries.

Using a casting table also allows for the production of aerogel materials which have a uniform thickness throughout the material. Aerogel materials of the present invention can have a thickness variation of less than 15%, less than 10%, less than 8%, less than 6%, less than 5%, less than 4%, less than 3%, and less than 2%. Within the context of the present invention, the thickness variation of an aerogel material can be determined by taking at least ten thickness measurements over the entire area of the aerogel material, calculating the mean and standard deviation of those thickness measurements, and then dividing the standard deviation by the mean. FIG. 5 represents a preferred embodiment of the present invention where the aerogel material has a thickness of between about 0.07 inches (~1.75 mm) to about 0.08 inches (~2 mm), and a thickness variation between about 1.5% and about 8%. FIG. 6 represents another preferred embodiment of the present invention where the aerogel material has a thickness of between about 0.03 (~0.75 mm) inches to about 0.04 inches (~1 mm), and a thickness variation between about 1.5% and about 8%. Thin aerogel materials with uniform thickness are advantageous because they provide predictable and consistent insulation characteristics. Thin aerogel materials with uniform thickness have minimal risk of being under-insulating in overly thin regions of the material or over-insulating in overly thick regions of the material.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 100° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using many extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e. pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, strong capillary forces generated by liquid evaporation can cause shrinkage and pore collapse within the gel material. Maintaining the mobile phase near or above the critical pressure and temperature during the solvent extraction process reduces the negative effects of such capillary forces. In some embodiments of the present invention, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than about 1070 psig. The pressure around the gel material is then slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

The embodiments of the present invention can be practiced using any of the processing, drying and treatment techniques discussed herein, as well as other processing, drying and treatment techniques known to those in the art for producing aerogels and aerogel materials as defined herein.

Aerogel compositions may be fiber-reinforced with various fiber reinforcement materials to achieve a more flexible, resilient and conformable composite product. The fiber reinforcement materials can be added to the gels at any point in the gelling process to produce a wet, fibrous gel composition. The wet gel composition may then be dried to produce a fiber-reinforced aerogel composition. Fiber reinforcement materials may be in the form of discrete fibers, woven materials, non-woven materials, battings, webs, mats, and felts. Fiber reinforcements can be made from organic fibrous materials, inorganic fibrous materials, or combinations thereof.

In a preferred embodiment, non-woven fiber reinforcement materials are incorporated into the aerogel composition as continuous sheet of interconnected or interlaced fiber reinforcement materials. The process comprises initially producing a continuous sheet of fiber reinforced gel by casting or impregnating a gel precursor solution into a continuous sheet of interconnected or interlaced fiber reinforcement materials. The liquid phase may then be at least partially extracted from the fiber-reinforced gel sheets to produce a sheet-like, fiber reinforced aerogel composition.

Aerogel composition can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [$B_4C$], Diatomite, Manganese ferrite, MnO, NiO, SnO, $Ag_2O$, $Bi_2O_3$, carbon black, titanium oxide, iron titanium oxide, zirconium silicate, zirconium oxide, iron (I) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to: $TiOSO_4$ or $TiOCl_2$.

The aerogel materials and compositions of the present invention have been shown to be highly effective as insulation materials. However, application of the methods and materials of the present invention are not intended to be limited to applications related to insulation. The methods and materials of the present invention can be applied to any system or application which would benefit from the unique combination of properties or procedures provided by the materials and methods of the present invention.

The aerogel materials of the present invention have been shown to be more effective at maintaining a thermal battery at operational temperatures for longer periods of time, as compared to insulation materials presently used in thermal batteries. The expected increase in runtime and/or energy capacity has been shown to be more than 50% longer than the best currently-available insulation.

Within the context of the present invention, the terms "improved battery life," "improved battery performance," or variations thereof refer to an increase in the duration of time that a thermal battery produces a voltage output at a specified level, with the increase resulting from the incorporation of an improved insulation material into the thermal battery. "Improved battery life" or "improved battery performance" can be reported as a percentage of the improved battery life relative to the original battery life. For example, a thermal battery having an original run time of 300 seconds and an improved run time of 450 seconds has an improved battery life of 150%. "Improved battery life" or "improved battery performance" can also be reported as an increase percentage of the improved battery life relative to the original battery life. For example, a thermal battery having an original run time of 300 seconds and an improved run time of 450 seconds has a battery life increase of 50%.

The term "22V run time" refers to the duration of time that a thermal battery produces a voltage output of 22 V or more after thermal activation of the battery. The term "16V run time" refers to the duration of time that a thermal battery produces a voltage output of 16V or more after thermal activation of the battery. The term "1V run time" refers to the duration of time that a thermal battery produces a voltage output of 1V or more after thermal activation of the battery. Thus, an improved battery performance for a 22V run time indicates that a thermal battery is able to produce a voltage output of 22V or more for a longer duration of time after thermal activation, with the increase resulting from the incorporation of an improved insulation material into the thermal battery. Voltage output can be measured using an Agilent 34970A Data Acquisition Instrument, as well as any other commonly used method of voltage measurement know in the art. Voltage output measurements are often temperature dependent. Voltage output measurements of the present invention are measured at −65° F. (−54° C.) and 70° F. (21° C.).

An aerogel material of the present invention can provide an improved thermal battery life when incorporated into a thermal battery. At −54° C., an aerogel material of the present invention can provide an improved thermal battery life of: i) up to about 300% improved battery performance for a 1V run time; up to about 250% improved battery improved battery performance for a 16V run time; and up to about 200% improved battery performance for a 22 V run time. At 21° C., an aerogel material of the present invention can provide an improved thermal battery life of: i) up to about 215% improved battery performance for a 1V run time; up to about 200% improved battery improved battery performance for a 16V run time; and up to about 175% improved battery performance for a 22V run time.

The following examples provide various embodiments and properties of the present invention.

Example 1

Casting Table

FIG. 2 illustrates a casting table 100 which was used for the production of thin sheets of Fiber-Reinforced Aerogel Materials. A 4 ft×6 ft sheet of PETG (polyethylene terephthalate glycol-modified) having a thickness of 0.078 inches (~2 mm) was placed onto a Teflon-covered 4 ft×6 ft table. A 3 ft×5 ft rectangle of PETG material was cut and removed from the interior of the PETG sheet. The remaining PETG material provided thickness control during the subsequent casting of the aerogel material. The thickness of the PETG material was chosen to provide a final cast thickness of 0.070 inches (~1.75mm) for the aerogel insulation material.

The resulting casting table 100 comprised a 3 ft×5 ft casting area 102, enclosed by a rectangular PETG casting frame which was 0.078 inches thick (~2 mm), and which had a perimeter of 4 ft×6 ft on the exterior edges 106, a perimeter of 3 ft×5 ft on the interior edges 104, and a uniform 1 ft width from the outer edges 106 to the inner edges 104. A roller bar 108 was used to spread a gelling solution throughout a fibrous batting during preparation of the aerogel insulation materials.

Example 2

Preparation of Fiber-Reinforced Aerogel Materials

FIGS. 1a-1h illustrate a method for producing thin aerogel materials of a uniform thickness. A sol-gel solution with a target density of 0.06 g/cc was prepared by hydrolyzing tetraethyl orthosilicate (TEOS) and methyltriethoxy silane (MTES) in the presence of acid. SiC F1200 Black (Carborex© F1200, Washington Mills) was added to the sol-gel solution.

Figure 1B:
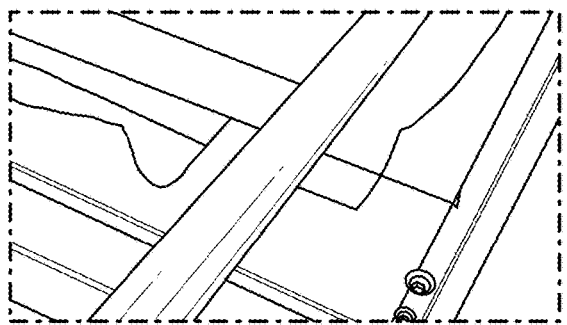
Figure 1C:
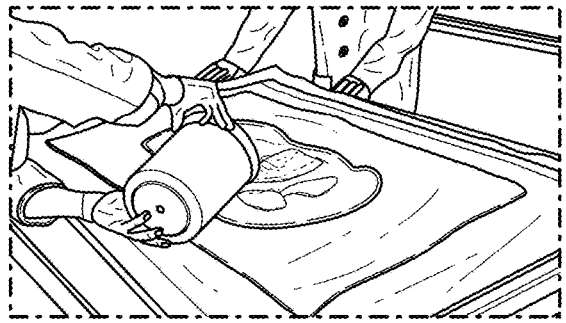
Figure 1D:
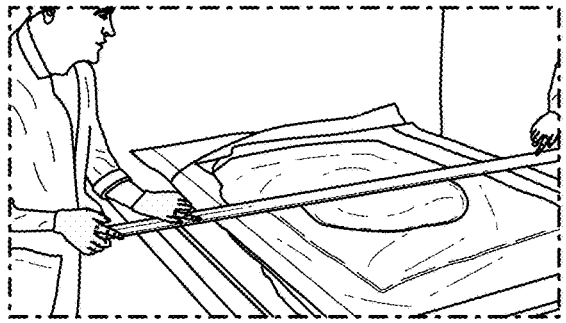
Figure 1E:
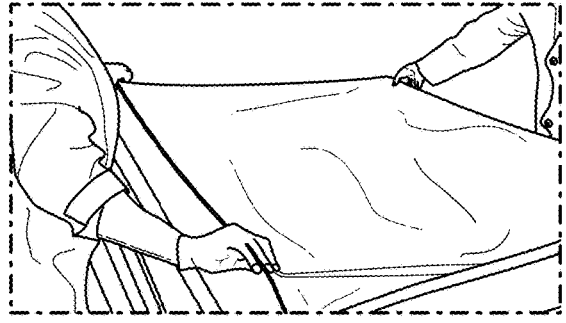

A lofty fiber batting (Quartzel©, Saint-Gobain Quartz) was placed into the casting area of the casting table of Example 1 (FIG. 1a). Ammonia was added to the sol-gel solution to initiate gelation. The sol-gel solution was then applied over a large portion of the batting material (FIGS. 1c and 1d). A nonporous Teflon sheet was placed over the casting table to minimize loss of ammonia during the casting process (FIG. 1e).

Figure 1F:
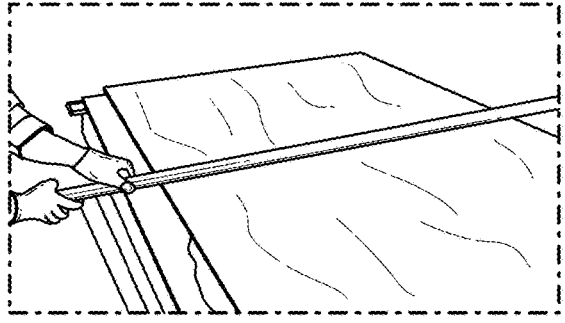
Figure 1G:
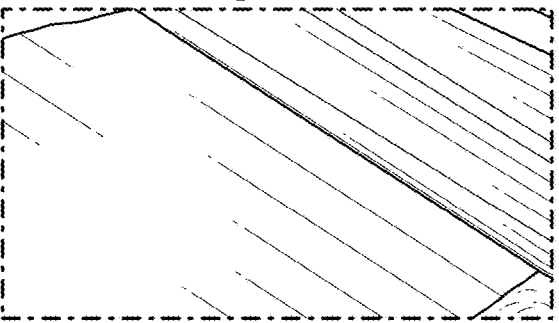

While the sol-gel solution was still in a substantially fluid state, the solution was spread throughout the batting using a roller. A roller bar was placed on one end of the casting frame (FIG. 1b). The roller bar was then rolled along the length of the casting frame while maintaining contact with the top surface of the casting frame (FIG. 1f). The weight and motion of the rolling bar functioned to evenly distribute the gelling solution throughout the batting material. Maintaining contact between the roller bar and the casting frame assured uniform thickness of the gel throughout the batting. The rolling process was continued through a gelation time of 2.5 minutes.

After gelation was complete (FIG. 1g), the composite sheets were aged for 16 hours in an ethanol solution with 8.5% H2O (v/v), 1.1 g/100 ml of ammonia, and 0.1M TMS at 68° C. The wet-gel composites were then subjected to supercritical $CO_2$ drying to produce a thin sheet of dry fiber-reinforced aerogel material.

The sheets of dry fiber-reinforced aerogel material were then heat-treated at 183° C. for 40 minutes, followed by calcination in air at 600° C. The heating profile for calcination at 600° C. involved three steps: 1) ramp to 600° C. with a ramp rate of 20° C./min; 2) dwell at 600° C. for 6 hours; and 3) cool down to room temperature naturally.

Example 3

Thickness Testing

Figure 1H:
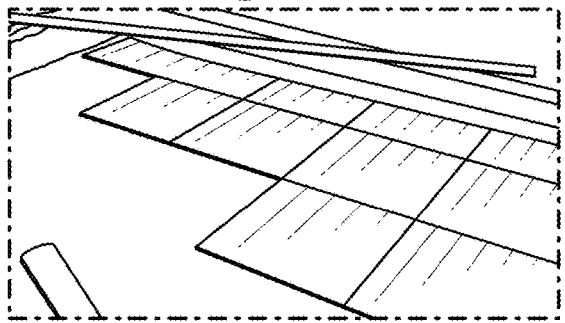

A sheet of aerogel material from example 2 was cut into 8 in×8 in coupons for testing (FIG. 1h). Sixteen thickness measurements were made on each of eighteen different coupons (for a total of 288 measurements) using a hand-held drop-gauge. These measurements were used to determine the overall thickness variation in a composite sheet, as well as product yield (based on thickness).

FIG. 5 shows the average thickness measurements for all 18 coupons, presented along with the respective variation percentages. All coupons exhibited thickness variation below 7%. At 100% yield, the overall average thickness was 0.0759" with 4.6% variation. Coupons prepared by this method demonstrated good particle dispersion and low thickness variation.

Example 4

Thermal Conductivity Testing

Figures 7, 8:
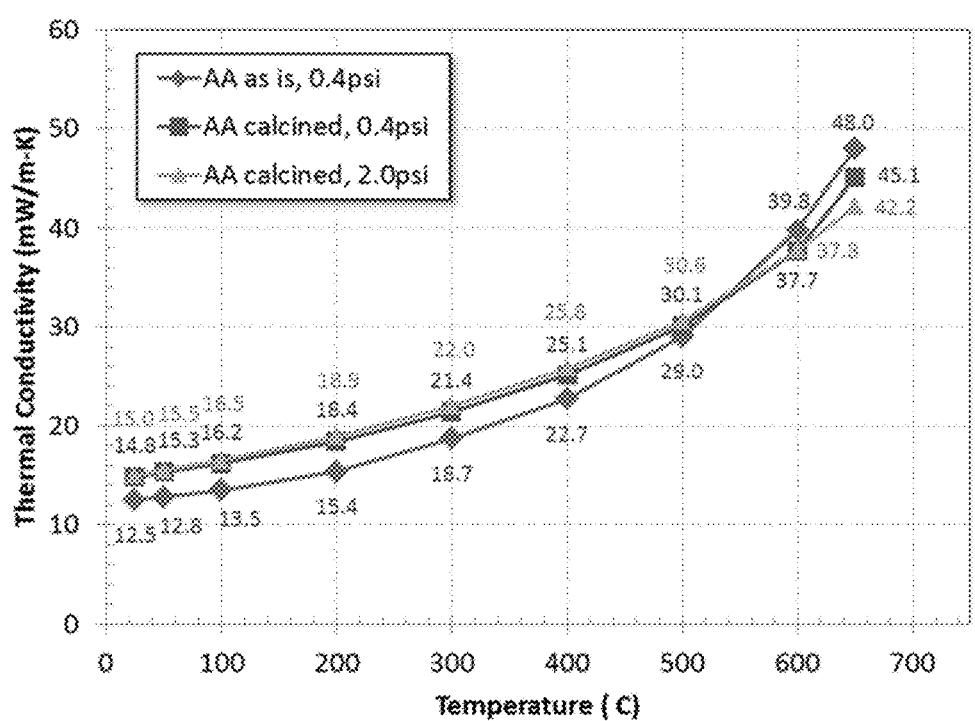
FIG. 7 is a table listing the thermal conductivity of multiple samples of an aerogel material according to one embodiment of the invention at different calcination states, temperatures, and pressures.
FIG. 8 is a chart depicting the thermal conductivity of multiple samples of an aerogel material according to one embodiment of the invention at different calcination states, temperatures, and pressures.

Coupons of aerogel material were prepared according to examples 1-3 above. The coupons were tested for thermal conductivity on a Guarded Hot Plate (GHP) according to ASTM C177 measuring standards, at temperatures up to 650° C. The results of the thermal conductivity measurements are shown in FIGS. 7-8.

Example 5

Flexural Testing

Coupons of aerogel material were prepared according to examples 1-3 above. The coupons were tested for flexure properties under ASTM C1101 testing standards. It was found that during flexure testing, the aerogel material did not rupture or break. The aerogel sheet materials were thus classified as flexible according to ASTM C1101 classification standards.

It was also found that the aerogel materials returned to original form when released from flexural testing. The aerogel sheet materials were thus classified as resilient flexible according to ASTM C1101 classification standards.

Example 6

Battery Performance Testing

Fifteen batteries were manufactured using G3190B2 thermal batteries from Enersys®, and test fired at −65° F. (−54° C.) and 70° F. (21° C.). The batteries can be identified according to the following insulation configurations: i) 5 Batteries built as control units using standard Fiberfrax® insulation for both the outer and inner wraps (Fiberfrax-Fiberfrax); 5 Batteries made using aerogel wrap insulation for both the outer and inner wraps (Aerogel-Aerogel); 5 Batteries made using Fiberfrax® insulation for the inner wrap and aerogel wrap insulation for the outer wrap (Fiberfrax-Aerogel).

Figure 9:
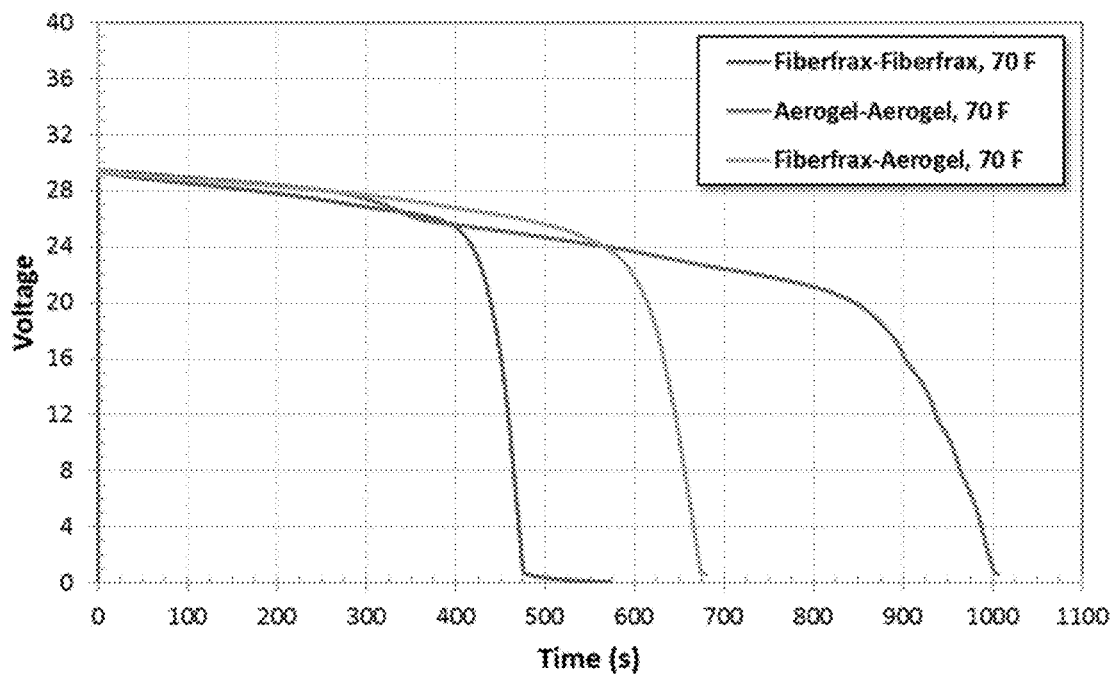
FIG. 9 is a chart depicting the voltage output over time at 70° F. (21° C.) of a thermal battery comprising various combinations of insulation materials, including an aerogel material according to one embodiment of the present invention.
Figure 10:
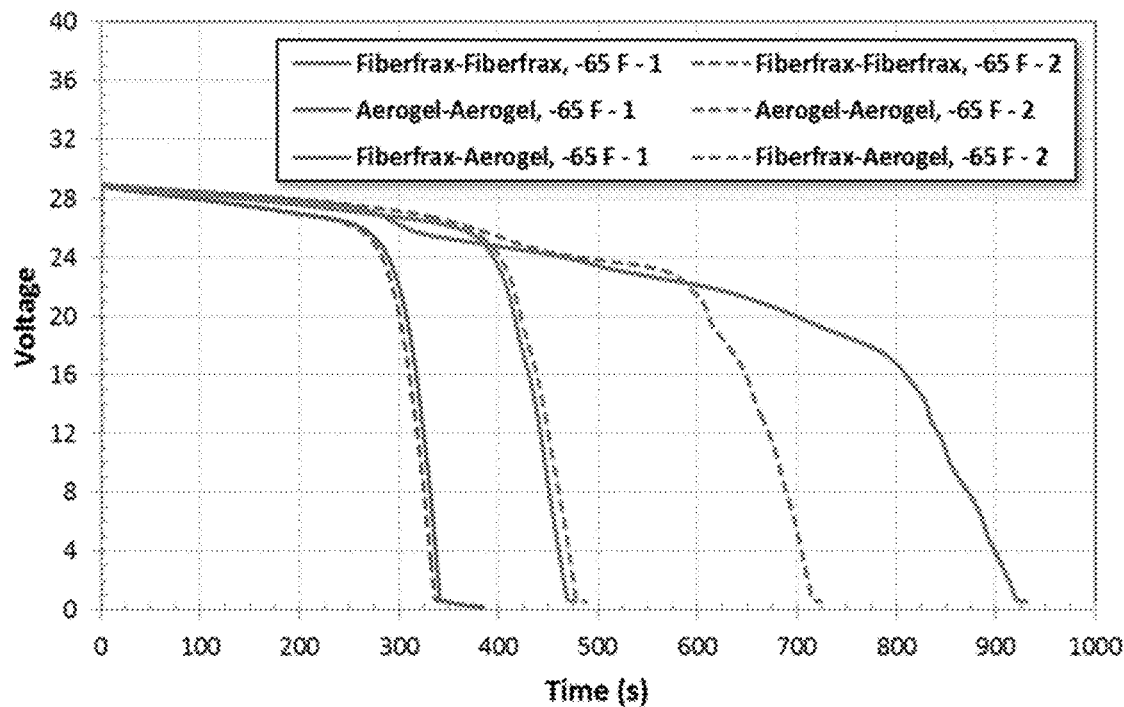
FIG. 10 is a chart depicting the voltage output over time at −65° F. (−54° C.) of a thermal battery comprising various combinations of insulation materials, including an aerogel material according to one embodiment of the present invention.

Prior to testing the batteries were conditioned to their respective environments: Room temperature: 66.2° F. (19° C.); and Cold temperature: −65° F. (−54° C.).
Voltage data was gathered with a calibrated Agilent 34970A Data Acquisition Instrument and the raw data was gathered at a rate of each L> second on a HP laptop computer. Voltage and temperature profiles were gathered versus time for all 15 test fired batteries. The results of the battery performance testing are shown in FIGS. 9-10.

Both the Aerogel-Aerogel and the Fiberfrax-Aerogel insulation configurations increased the amount of time that heat was maintained in the core of the battery's electrochemical cell, thus increasing the lifetime of the battery. Test firings at −65° F. (−54° C.) showed an average 103% increase in lifetime for the Aerogel-Aerogel wrapped battery (603 seconds) over the Fiberfrax-Fiberfrax control battery (297 seconds) tested at the same temperature.

What is claimed:

1. A reinforced aerogel composition comprising:
   an aerogel framework and a reinforcement material, the reinforced aerogel composition having a thickness of from 0.75 mm to 2 mm and a thickness variation of less than 15%.
2. The reinforced aerogel composition of claim 1, wherein the reinforcement material comprises an open-cell foam reinforcement material, and a fiber reinforcement material.
3. The reinforced aerogel composition of claim 1, wherein the reinforcement material comprises a fibrous reinforcement material comprising discrete fibers, a woven material, a non-woven material, a batting, a web, a mat, a felt, or a combination thereof.
4. The reinforced aerogel composition of claim 3, wherein the fibrous reinforcement material comprises glass-based fibers.
5. The reinforced aerogel composition of claim 3, wherein the fibrous reinforcement material comprises silica-based fibers.
6. The reinforced aerogel composition of claim 5, wherein the reinforced aerogel composition has a thermal conductivity in a range of about 12 mW/mK and about 20 mW/mK.
7. The reinforced aerogel composition of claim 3, wherein the fibrous reinforcement material comprises ceramic fibers.
8. The reinforced aerogel composition of claim 1, wherein the thickness variation is less than 6%.
9. The reinforced aerogel composition of claim 1, wherein the thickness variation is from 2% to less than 15%.
10. The reinforced aerogel composition of claim 1, wherein the reinforced aerogel composition has a thermal conductivity of about 25 mW/mK or less.
11. The reinforced aerogel composition of claim 1, wherein the reinforced aerogel composition has a thermal conductivity of about 50 mW/mK or less.
12. The reinforced aerogel composition of claim 11, wherein the reinforced aerogel composition has a thermal conductivity of between about 12 mW/mK and about 50 mW/mK.
13. The reinforced aerogel composition of claim 1, wherein the reinforced aerogel composition includes a silica-based framework.
14. The reinforced aerogel composition of claim 1, wherein the reinforced aerogel composition includes an organic aerogel.
15. The reinforced aerogel composition of claim 1, wherein the reinforced aerogel composition has a density in a range of about 0.60 g/cc and about 0.30 g/cc.
16. The reinforced aerogel composition of claim 1, wherein the thickness is from 1 mm to 2 mm.
17. The reinforced aerogel composition of claim 1, wherein the reinforced aerogel composition is a flexible aerogel blanket composition.
18. The reinforced aerogel composition of claim 1, wherein the reinforced aerogel composition has a resilience of from 50% to 95%.
19. A battery comprising the aerogel reinforced composition of claim 1.
20. A method of improving performance of a battery comprising incorporating the reinforced aerogel composition of claim 1 into the battery.

* * * * *